United States Patent
Lopez De Arroyabe

(10) Patent No.: US 11,084,382 B2
(45) Date of Patent: Aug. 10, 2021

(54) VEHICLE ENERGY STORE

(71) Applicant: Bayerische Motoren Werke Aktiengesellschaft, Munich (DE)

(72) Inventor: Jose Lopez De Arroyabe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/677,130

(22) Filed: Nov. 7, 2019

(65) Prior Publication Data

US 2020/0076218 A1  Mar. 5, 2020

Related U.S. Application Data

(63) Continuation of application No. PCT/EP2018/063240, filed on May 18, 2018.

(30) Foreign Application Priority Data

May 31, 2017 (DE) ..................... 10 2017 209 183.5

(51) Int. Cl.
*B60L 3/04* (2006.01)
*B60L 58/22* (2019.01)
(Continued)

(52) U.S. Cl.
CPC ................ *B60L 3/04* (2013.01); *B60L 50/15* (2019.02); *B60L 58/22* (2019.02);
(Continued)

(58) Field of Classification Search
CPC .. B60L 3/04; B60L 58/22; B60L 50/15; B60L 58/27; B60L 58/10; B60L 58/19;
(Continued)

(56) References Cited

U.S. PATENT DOCUMENTS 5,773,962 A * 6/1998 Nor ....................... B60L 3/0046
320/134
7,044,264 B2 * 5/2006 Uryu ..................... B62D 5/049
180/446

(Continued)

FOREIGN PATENT DOCUMENTS

CN         102244498 B  *  9/2013   ......... H01H 85/0047
DE    10 2011 011 799 A1    8/2012
(Continued)

OTHER PUBLICATIONS

PCT/EP2018/063240, International Search Report dated Jul. 20, 2018 (Three (3) pages).

(Continued)

*Primary Examiner* — M Baye Diao
(74) *Attorney, Agent, or Firm* — Crowell & Moring LLP

(57) ABSTRACT

A vehicle energy store for the electrical supply of an electric drive unit of a motor vehicle, includes a connection of positive potential and a connection of negative potential connected to the drive unit when the vehicle energy store is operated normally. The energy store also includes a first section connecting the connection of positive potential and the connection of negative potential to each other and in which at least one electrical energy storage cell is disposed, and a second section parallel to the first section that connects the connection of positive potential and the connection of negative potential to each other and in which at least one electrical energy storage cell is disposed. At least one semiconductor switch element is configured to be controlled to interrupt a current flowing in a respective one of the first section and the second section is disposed in each of the first section and the second section.

15 Claims, 4 Drawing Sheets

(51) Int. Cl.
  *B60L 50/15*   (2019.01)
  *H02J 7/00*   (2006.01)
  *H02J 7/14*   (2006.01)
  *B60L 58/27*   (2019.01)

(52) U.S. Cl.
  CPC .......... *H02J 7/007184* (2020.01); *H02J 7/14* (2013.01); *B60L 58/27* (2019.02)

(58) Field of Classification Search
  CPC .... B60L 58/21; B60L 50/66; B60L 2240/549; B60L 3/0046; H02J 7/007184; H02J 7/14; H02J 7/00304; H02J 7/0024; Y02T 10/7072; Y02T 90/14; Y02T 10/70
  USPC ........................................................ 307/10.7
  See application file for complete search history.

(56) References Cited

U.S. PATENT DOCUMENTS

| | | | | |
|---|---|---|---|---|
| 7,893,561 | B2* | 2/2011 | Weidenheimer | F41B 6/00 307/71 |
| 7,977,818 | B1* | 7/2011 | Wahl | H02J 3/383 307/53 |
| 8,760,825 | B2* | 6/2014 | Erger | H01H 9/168 361/42 |
| 9,337,669 | B2* | 5/2016 | Boda | H02J 7/0026 |
| 9,496,749 | B2* | 11/2016 | Noda | H02J 7/1461 |
| 9,671,433 | B2* | 6/2017 | Ausserlechner | G01R 15/207 |
| 9,908,418 | B2* | 3/2018 | Lopez De Arroyabe | B60L 11/18 |
| 10,186,369 | B2* | 1/2019 | Saveliev | H01F 29/04 |
| 2003/0142513 | A1* | 7/2003 | Vinciarelli | H02M 1/08 363/17 |
| 2009/0066291 | A1* | 3/2009 | Tien | H02J 7/0069 320/118 |
| 2012/0161524 | A1* | 6/2012 | Weidenheimer | F41B 6/00 307/71 |
| 2017/0120770 | A1 | 5/2017 | Huynh et al. | |

FOREIGN PATENT DOCUMENTS

| | | | |
|---|---|---|---|
| DE | 10 2011 115 550 | A1 | 4/2013 |
| DE | 10 2012 205 957 | A1 | 10/2013 |
| DE | 10 2012 213 053 | A1 | 1/2014 |
| EP | 2 403 105 | A2 | 1/2012 |
| EP | 2 910 405 | A1 | 8/2015 |
| JP | 5732570 | B2 * | 6/2015 |
| WO | WO 2017/074480 | A1 | 5/2017 |

OTHER PUBLICATIONS

German Search Report issued in German counterpart application No. 10 2017 209 183.5 dated May 30, 2018, with Statement of Relevancy (Twelve (12) pages).

Darlington-Schaltung; Wikipedia, URL: https://de.wikipedia.org/w/index.php?title=Darlington-Schaltung&oldid=160375278, May 29, 2018, Three (3) total pages.

\* cited by examiner

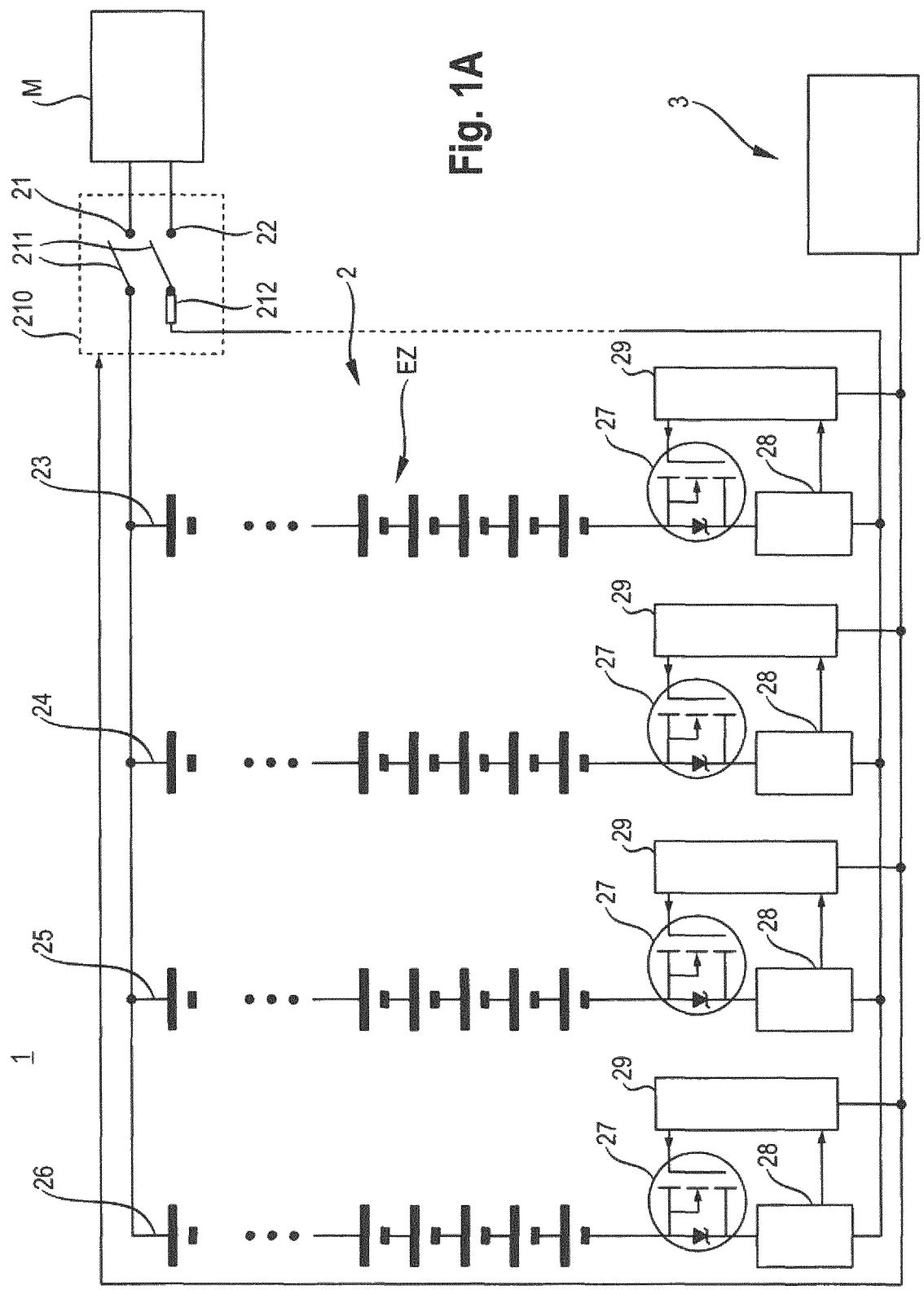

VEHICLE ENERGY STORE

CROSS REFERENCE TO RELATED APPLICATIONS

This application is a continuation of PCT International Application No. PCT/EP2018/063240, filed May 18, 2018, which claims priority under 35 U.S.C. § 119 from German Patent Application No. 10 2017 209 183.5, filed May 31, 2017, the entire disclosures of which are herein expressly incorporated by reference.

BACKGROUND AND SUMMARY OF THE INVENTION

The present invention relates to a vehicle energy store, in particular a vehicle energy store for the electrical supply of an electric drive unit of a motor vehicle.

In the prior art, a number of battery configurations are known that act as vehicle energy stores for motor vehicles.

For example, in the prior art 96 battery cells are connected in series (topology 1). In this configuration, the battery cells are used together to supply an electric drive unit of a motor vehicle.

Developments in electric vehicles, which have recently been strongly promoted due to environmental considerations and increasingly scarce fossil fuels, require more and more power and greater energy density. In order to meet these requirements, battery configurations with multiple battery cells that are connected in parallel are increasingly being used. In this respect, for example, two different types of battery configurations are known.

On the one hand, four battery cells are connected in parallel, so that they form a group. Then, for example, 96 such groups are connected in series (topology 2).

On the other hand, for example, 96 individual battery cells are connected in series so that they form a section. Then, four such sections are connected to each other in parallel (topology 3).

The resulting increase in the power and energy density of the battery configurations also leads to increased short-circuit currents, which can potentially occur in an accident, for example. At typical voltages in the order of 400V used in the field of motor vehicles, the short-circuit currents in the first battery configuration (topology 1) are approx. 4000 A. In order to reliably isolate these short-circuit currents, contactors and fuses that are available on the market are strongly required.

If additional parallel-connected battery cells are added, as in the other two previously discussed battery configurations (topology 2 and 3), the short-circuit currents increase to up to 30,000 A. On this scale of the currents to be handled, contactors and fuses reach the limits of what is possible. On the one hand, the contactors cannot trigger quickly enough and must therefore have sufficient current strength until the fuse responds. On the other hand, even for fuses, it is difficult to reliably isolate currents at this level. In addition, harnesses and plugs installed in the motor vehicle must withstand these high short-circuit currents and therefore must be dimensioned accordingly. Above all, plugs are a problem in this context.

Accordingly, other solutions have been developed in the prior art, which can do without contactors and fuses and can handle such short-circuit currents. These solutions are based on pyrotechnic switches that blow the connectors off from the battery in the event of a short-circuit. It is in the nature of the matter that such pyrotechnic switches can only be triggered once and then require renewal.

In addition to the mentioned problems with the battery configurations discussed, in particular topology 1 and 2, the level of the triggering current at which the battery is triggered must be determined, taking into account a safety factor. The safety factor is in the order of 10% and is due to the fact that the current flowing through the battery can be distributed asymmetrically to the parallel battery cells, but there is no precise knowledge about this. In this respect, the battery power in the battery configurations cannot be fully utilized.

Against this background, an object of the present invention is to create a vehicle energy store that allows reliable and non-destructive isolation in the event of high occurring currents. Furthermore, the present invention is based on the secondary object of enabling good utilization of the available battery power.

According to one aspect of the invention, a vehicle energy store for the electrical supply of an electric drive unit of a motor vehicle includes:

a connection of positive potential and a connection of negative potential, which are connected to the drive unit when the vehicle energy store is operated normally;

a first section that connects the connection of positive potential and the connection of negative potential to each other and in which at least one electrical energy storage cell is disposed; and at least one second section, which connects the connection of positive potential and the connection of negative potential to each other in parallel with the first section and in which at least one electrical energy storage cell is also disposed; wherein at least one semiconductor switch element, which is controllable for interruption of a current flowing in the respective section, is disposed in each of the first section and the second section.

The vehicle energy store according to the invention may preferably have a third and a fourth section in addition to the first section and the second section. Both the third and fourth sections connect the connection of positive potential to the connection of negative potential in parallel with the first and second sections. Generally speaking, the vehicle energy store according to the invention may contain, in addition to the first and second section, a number of further, parallel sections in which at least one electrical energy storage cell is disposed.

The voltage supplied by the vehicle energy store according to the invention is preferably 400V.

The first and second sections may be identical or differently constructed, especially with regard to the number of energy storage cells. The same applies to the third and/or fourth sections or the many other sections.

An energy storage cell is understood to mean a structural unit that comprises a housing in which, for example, an electrolyte solution (e.g. a lithium accumulator) is contained and on which the corresponding electrodes for connecting the energy storage cells are disposed.

Particularly preferably, between 80 and 110, most preferably 96 individual energy storage cells are disposed in each section of the vehicle energy store. Each section then preferably forms an energy storage module, which together constitute the vehicle energy store.

The vehicle energy store according to the invention may be structurally designed, for example, in such a way that it comprises a carrier housing with individual compartments, in which each one of the energy storage cells is inserted. The carrier housing can be composed of individual module housings, wherein each module housing comprises the compartment or the compartments for the energy storage cell(s) of one of the energy storage modules.

According to the invention, in the first section and the second section, generally in each section, at least one semiconductor switch element is disposed, which can be controlled to interrupt the current flowing in the respective section. The semiconductor switch element may preferably be one or a plurality of field effect transistors or bipolar transistors. In particular, in the context of the invention, field effect transistors, such as MOSFETs, or bipolar transistors, such as IGBTs, are considered.

By the fact that a semiconductor switch element is disposed in both the first section and the second section, very high currents that flow through the respective section remain manageable. Fuses, pyrotechnic switches or contactors can preferably be completely dispensed with.

Also, by the use according to the invention of semiconductor switch elements in each of the sections, the section-wise interruption can be carried out so quickly that short-circuit currents no longer assume their maximum values or can be very much limited. As a result, harnesses and plugs can be dimensioned smaller in terms of current strength (they no longer have to withstand the 30 kA short-circuit currents that occur in the state of the art). This leads, among other things, to weight savings and lower costs.

In addition, valuable space can be saved because semiconductor switch elements are usually much smaller in size than, for example, a contactor, fuses or relays.

The semiconductor switch elements are designed in such a way that they can at least interrupt the current of the vehicle energy store flowing in the discharge direction.

Preferably, the vehicle energy store according to the invention further contains a current measuring element, which is disposed in the first section, and another current measuring element, which is disposed in the second section, wherein the current measuring elements can be connected to a current measuring device for measuring the current flowing in the respective section.

The current measuring elements, i.e. the current measuring element disposed in the first section and the current measuring element disposed in the second section, are preferably measuring resistors, for example shunt resistors, by means of which the respective current flowing in the corresponding section can be measured. Alternatively, the current measuring element can also be a Hall effect sensor, which outputs a corresponding Hall voltage depending on the current flowing in the corresponding section.

The current measuring device may be formed differently in the number and assignment thereof to the sections. The current measuring device(s), as explained below for example, together with the semiconductor switch elements, the current measuring elements and the energy storage cells can be integrated into the carrier housing or the module housing (distributed short-circuit interruption). This saves further valuable installation space.

Alternatively, the current measuring device(s) can be part of a control unit that performs other functions in addition to the current measurement.

By the arrangement according to the invention of the current measuring element in each of the sections it is possible to measure the respective current flowing through the corresponding section, therefore knowledge is obtained about whether the current load on the first and second sections, generally distributed to the number of sections, is distributed symmetrically or asymmetrically. Generally speaking, there are no unknown balancing currents. For this reason, it is no longer necessary to take into account the safety factor used in the prior art, which is why in normal operation of the vehicle energy store according to the invention the power limit of the vehicle energy store can be approached without the risk of inadvertently overloading the first or second section. Overall, performance increases of the mentioned 10% are possible.

Preferably, the vehicle energy store according to the invention further contains a current measuring device that is assigned to the first section and that is connected to the current measuring element disposed in the first section for measurement of the current flowing in the first section; and a current measuring device assigned to the second section, which is connected to the current measuring element disposed in the second section for measuring the current flowing in the second section.

The current measuring device assigned to the first section is preferably arranged to measure the current flowing in the first section and to control the semiconductor switch element disposed in the first section for interruption of the flowing current if the current flowing in the first section exceeds a threshold.

Similarly, the current measuring device assigned to the second section is preferably arranged to measure the current flowing in the second section and to control the semiconductor switch element disposed in the second section to interrupt the flowing current if the current flowing in the second section exceeds a threshold.

The semiconductor switch element disposed in the first section and in the second section is controlled by the corresponding assigned current measuring device for interrupting the flowing current when a short circuit occurs between the connection of positive potential and the connection of negative potential and the resulting short-circuit current flowing in the discharge direction exceeds the corresponding threshold.

The threshold with which the current flowing in the first section is compared and the threshold with which the current flowing in the second section is compared may be identical or different.

The same applies to the current measuring device assigned to the first section and the current measuring device assigned to the second section. This means that the current measuring devices may be designed identically or differently.

Alternatively, the vehicle energy store according to the invention may continue to have:
a current measuring device assigned to the first section and the second section, which is connected to the current measuring elements for measuring the current flowing in the respective section; wherein
the current measuring device is arranged,
to individually measure the current flowing in the first section and the current flowing in the second section, and
to control the semiconductor switch element disposed in the first section and the semiconductor switch element disposed in the second section to interrupt the current flowing in the respective section if the current flowing in the first section or the current flowing in the second section exceeds a threshold.

Generally speaking, a single current measuring device may be provided for both the first section and the second section. If in this embodiment the current flowing in the first section or the current flowing in the second section exceeds the threshold, all semiconductor switch elements are controlled at the same time to interrupt the current flowing in the first and second sections.

Particularly preferably, the vehicle energy store according to the invention is designed as explained above, wherein the current measuring device assigned to the first section and/or the second section comprises a comparator circuit that compares the current measured by the current measuring device with the threshold and controls the semiconductor switch element to interrupt the flowing current if the flowing current exceeds the threshold.

For example, the comparator circuit is an operational amplifier at which, for example, the voltage drop across the current measuring element (or the Hall voltage) is applied to its non-inverting input, and which compares the applied voltage with a reference voltage (threshold) at the inverting input. The output signal of the operational amplifier controls the corresponding semiconductor switch element for this purpose. For example, the output of the operational amplifier is connected to an at least bi-stable driver circuit (for example, the driver circuit contains at least one flipflop), which in turn is connected to the gate connection of a transistor forming the semiconductor switch element.

Further preferred is the vehicle energy store according to the invention as explained above, wherein a number of semiconductor switch elements is disposed in each of the first and/or second section, and the number of semiconductor switch elements includes a group of parallel connected semiconductor switch elements, which are jointly controlled by the respective current measuring device to interrupt the current flowing in the respective section if the current flowing in the section exceeds the threshold.

By providing a number of semiconductor switch elements, it is preferably achieved that the current load of the individual semiconductor switch elements is reduced.

In this context, the vehicle energy store according to the invention is preferably designed in such a way that:

in the first section a group of parallel connected semiconductor switch elements is disposed, which is jointly controlled by the current measuring device assigned to the first section to interrupt the current flowing in the first section if the current flowing in the first section exceeds the threshold in a given current direction;

in the second section a group of parallel connected semiconductor switch elements is disposed, which is jointly controlled by the current measuring device assigned to the second section for interruption of the current flowing in the second section if the current flowing in the second section in the specified current direction exceeds the threshold;

the number of semiconductor switch elements in the first and second sections includes another group of parallel connected semiconductor switch elements;

the further group of parallel connected semiconductor switch elements disposed in the first section is jointly controlled by the current measuring device assigned to the first section to interrupt the current flowing in the first section if the current flowing in the first section in a current direction opposite to the specified current direction exceeds the threshold; and the further group of parallel connected semiconductor switch elements disposed in the second section is jointly controlled by the current measuring device assigned to the second section to interrupt the current flowing in the second section if the current flowing in the second section in the opposite current direction exceeds the threshold.

This embodiment of the vehicle energy store according to the invention is particularly advantageous if the semiconductor switch elements are formed from field effect transistors (MOSFET). Such transistors can, by their very nature, block only in one direction because they contain an intrinsic diode that ensures that the field effect transistor cannot block in the opposite direction. For this reason, at least two groups of semiconductor switch elements are disposed in both the first section and the second section, wherein one group can interrupt the current flowing in one direction and the other group can interrupt the current flowing in the opposite current direction.

Generally speaking, the corresponding vehicle energy store according to the invention is able to interrupt the entire current flow if the corresponding current exceeds the threshold value in the first section or in the second section, and this independently of the direction in which the current flows through the corresponding section. In this respect, short circuits and the corresponding short-circuit currents can be handled when the vehicle energy store is discharged or charged normally.

The current flowing through the corresponding section can be measured for both current directions by means of the current measuring element disposed in the respective section.

Preferably, the vehicle energy store according to the invention further comprises:

a switching arrangement, which is disposed in series with the mutually parallel disposed sections and comprises at least one further semiconductor switch element, wherein the switching arrangement is arranged to control the further semiconductor switching element depending on a control signal to interrupt an entire current flowing through the vehicle's energy store.

The further semiconductor switch element of the switching arrangement is preferably arranged in such a way that in particular it can interrupt a current flowing in the vehicle energy store according to the invention. In other words, the other semiconductor switch element can interrupt the charging current. Owing to this embodiment of the vehicle energy store according to the invention, the group disposed in the first section and the group disposed in the second section, which are each provided for the interruption of the charging current, could be replaced by the further semiconductor switch element. Preferably, the switching arrangement may also comprise a number of parallel connected semiconductor switch elements to reduce the current load. The control of the further semiconductor switch element or the further semiconductor switch elements is explained below.

The invention also preferably relates to a vehicle energy store for the electrical supply of an electric drive unit of a motor vehicle, wherein the system comprises:

a vehicle energy store as explained above; and a vehicle store control device connected to the further semiconductor switch element(s) of the switching arrangement to interrupt the total current flowing through the vehicle energy store and the current measuring device(s) to obtain information about whether the current flowing in the first and/or second section exceeds the relevant threshold.

The vehicle store control device is preferably arranged to detect a process of charging the vehicle energy store and to control the further semiconductor switch element(s) to interrupt the entire current flowing through the vehicle energy store if the current flowing in the first and/or second section exceeds the corresponding threshold.

The embodiments of the vehicle energy store according to the invention or the vehicle energy store that make it possible to interrupt the charging current and the discharge current, at the same time make it possible to make a legally prescribed switch, by means of which the vehicle energy store can be electrically isolated from the drive unit, smaller in terms of current strength, because by using the described semiconductor switch elements the short-circuit currents can be switched so fast that the switch no longer has to meet high requirements.

Finally, the invention concerns a motor vehicle comprising a vehicle energy store or a vehicle energy storage system as described above.

As can be seen from the previous description, short-circuit currents in both directions (charging current and discharge current) can be controlled by the use of the semiconductor switch elements. In particular, the corresponding currents can be interrupted by the semiconductor switch elements so quickly that the short-circuit currents no longer adopt the aforementioned values of 30 kA. This applies in particular in the case in which the vehicle energy store according to the invention comprises at least four identically formed sections, in each of which a number of energy storage cells (for example 96 energy storage cells) are disposed. The elements loaded by the short-circuit currents can therefore be dimensioned smaller with regard to the current strength.

As a rule, manufacturers of vehicle energy stores set warranty limits which state that the current flowing through the vehicle energy store may only assume a maximum value for a certain period of time. In that by the present invention the interruption of the current flowing in the short-circuit case can take place so quickly that the short-circuit current does not assume extreme values, the mentioned warranty limits can be well adhered to even in the short-circuit case. Warranty costs are massively reduced as a result; in addition, time in the workshop can be avoided under certain circumstances (no vehicles out of action).

Preferred embodiments of the invention are described below with reference to the attached figures.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1A shows a vehicle energy storage system according to the invention in accordance with a first preferred embodiment, which comprises a vehicle energy store according to the invention, a switching arrangement for electrical separation of the vehicle energy store from an engine and a vehicle store control device.

DETAILED DESCRIPTION OF THE DRAWINGS

Figure 1B:
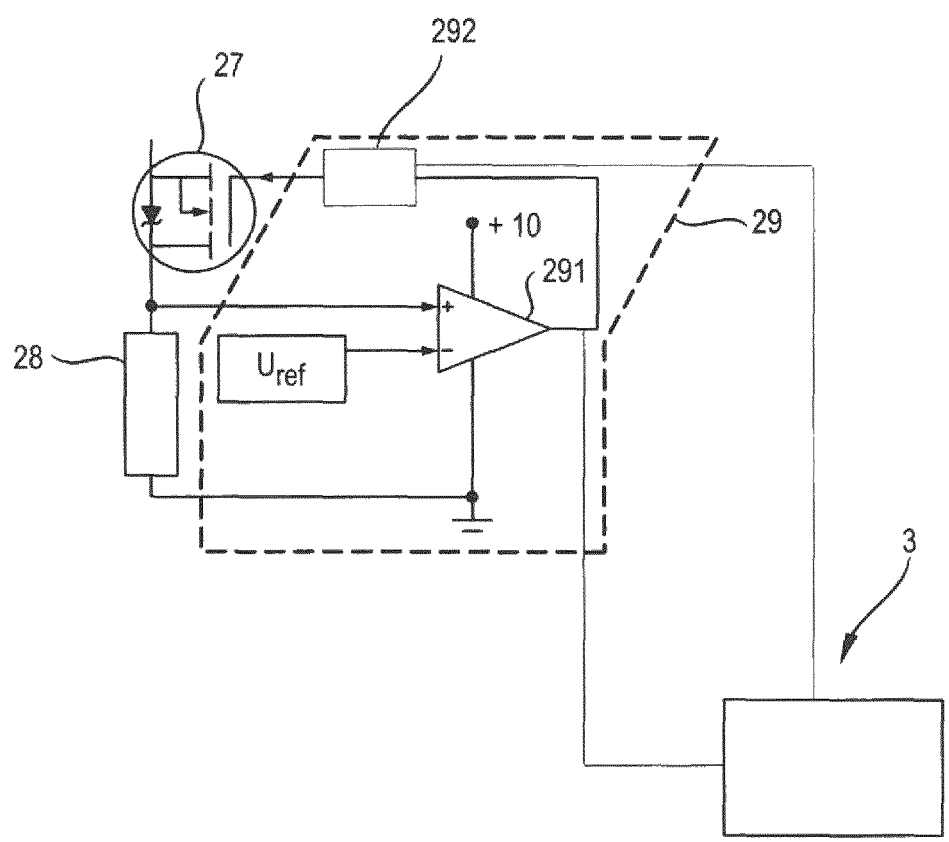
FIG. 1B shows a more detailed representation of a current measuring device of the vehicle energy store shown in FIG. 1A.

FIG. 1A shows a first preferred embodiment of a vehicle energy storage system 1 according to the invention, which comprises a vehicle energy store 2 according to the invention and a vehicle store control device 3.

The vehicle energy store 2 according to the invention contains a connection of positive potential 21 and a connection of negative potential 22, by means of which the vehicle energy store 2 according to the invention is connected to a load. The load in this preferred embodiment is an electric drive unit M of a motor vehicle and is supplied with electrical energy for the drive of the motor vehicle stored in the vehicle energy store 2.

The vehicle energy store 2 according to the invention contains a first section 23 that electrically connects the connection of positive potential 21 to the connection of negative potential 22. A number of electrical energy storage cells EZ are disposed in the first section 23, wherein the individual energy storage cells EZ are connected together in series.

A semiconductor switch element 27 and a current measuring element 28 are arranged in series with the energy storage cells EZ in the first section 23.

In addition to the first section 23, the vehicle energy store 2 according to the invention contains a second section 24, a third section 25 and a fourth section 26. The second section 24, the third section 25 and the fourth section 26 are each arranged in parallel with the first section 23 and connect the connection of positive potential 21 to the connection of negative potential 22. The second, third and fourth sections 24-26 are each identical to the first section 23 and contain the same elements. In that regard, the following statements apply equally to all sections 23-26.

The energy storage cells EZ are preferably lithium accumulators, each with a housing in which a suitable electrolyte solution is accommodated with the other elements and on which the corresponding cell connections (anode or cathode) are disposed. The energy storage cells EZ are preferably inserted in compartments of a carrier housing (not shown).

The semiconductor switch element 27 disposed in the first section 23 can be controlled in such a way that it interrupts the current flowing in the first section 23. This interruption preferably occurs when a short circuit occurs in the electric drive unit M, in that the connection of positive potential 21 is connected to the connection of negative potential 22 and the resulting short-circuit current in the first section 23 exceeds a certain threshold. For this purpose, the first section 23 contains an associated current measuring device 29, which is connected on the one hand to the semiconductor switch element 27 and on the other hand to the current measuring element 28 disposed in the first section 23.

The other sections 24-26 are identically constructed, i.e. they also each include a semiconductor switch element 27, a current measuring element 28 and a current measuring device 29 assigned to the corresponding section, wherein the respective current measuring devices 29 are arranged to measure the current flowing in the corresponding section and to control the corresponding semiconductor switch element 27 to interrupt the current flowing in the section.

The semiconductor switch element 27 disposed in each of the sections is embodied as a field effect transistor in this embodiment, wherein a gate connection of the respective field effect transistor is connected to the current measuring device 29.

Preferably, however, a number of semiconductor switch elements 27, i.e. transistors, may be disposed in each of the sections 23-26, wherein in this case in each of the sections the semiconductor switch elements 27 are disposed parallel to each other and can be jointly controlled by the respective current measuring device 29.

Preferably, the vehicle energy store 2 according to the invention still contains a switching arrangement 210, which comprises a switching contactor 211 and a fuse 212.

In addition to the vehicle energy store 2 according to the invention, the vehicle energy storage system 1 according to the invention also contains a vehicle store control device 3, which is connected on the one hand to the current measuring devices 29 and on the other hand to the switching arrangement 210. The vehicle store control device 3 can be a separate battery management system or a control unit that performs other functions in addition to battery management.

The vehicle store control device 3 can preferably control the contactor 211 in such a way that it interrupts the connection to the connection with positive potential 21 and the connection with negative potential 22.

The vehicle energy storage system 1 according to the invention is arranged to interrupt the entire current flowing through the vehicle energy store 2 when a short circuit occurs. Such a short circuit can occur on the one hand when discharging the vehicle energy store 2, i.e. in normal operation of the drive unit M, and on the other hand when charging the vehicle energy store 2, i.e. when an external power supply is connected to the connection with positive potential 21 and the connection with negative potential 22.

Short Circuit when Discharging the Vehicle Energy Store 2

During normal operation of the vehicle energy storage system 1, the vehicle store control device 3 closes the contactor 211, whereby the drive unit M is supplied with the energy stored in the vehicle energy store 2 according to the invention for driving the motor vehicle.

If in this state, for example, a short circuit occurs in the drive unit M, a short-circuit current is generated, which flows through the entire vehicle energy store 2 and which must be interrupted. This is done according to the invention in that in each of the sections 23-26 the corresponding current flowing through the semiconductor switch element 27 is interrupted if the current flowing in the respective section exceeds a certain threshold. This will be explained with reference to FIG. 1B.

As can be seen from FIG. 1B, the current measuring device 29 of each section contains an operational amplifier 291, which performs the function of a comparator. One of the connections for the operating voltage of the operational amplifier 291 is at a positive potential (e.g. 10V) and the other of the connections is at a mass potential, so that the output of the operational amplifier 291 can switch between the positive potential and the mass potential.

The output of the operational amplifier 291 is connected to a driver 292, which can take at least two stable states. For this purpose, the driver 292 contains a flipflop, for example. In addition, the driver 292 may also contain elements to reduce the gate source voltage of the corresponding transistor. These elements may include optocouplers.

The current measuring device 29 is electrically connected to the current measuring element 28 for measuring the respective current flowing in the corresponding section. The current measuring element 28 is preferably a measuring resistor (for example, a shunt) or a Hall effect sensor, which outputs a certain Hall voltage depending on the strength of the current flowing in the section.

More specifically, the non-inverting input of the operational amplifier 291 is connected to the measuring resistor or the Hall effect sensor so that the voltage drop across the measuring resistance or the Hall voltage serves as the input signal of the current measuring device 29.

At the inverting input of the operational amplifier 291 there is a reference voltage Uref, with which the voltage drop across the measuring resistance or the Hall voltage (generally the input signal) is compared. In this respect, the reference voltage Uref forms the threshold for comparison.

If the vehicle energy store 2 according to the invention is in a normal functional mode, in which normal currents are flowing in the respective sections, then the value of the voltage drop across the measuring resistance or the Hall voltage is below the reference voltage Uref. As a result, the operational amplifier 291 outputs the positive potential at its output and the driver 292 is or remains in a state in which the semiconductor switch element 27 or the transistor is in its conductive state. In this conductive state, the transistor can—ideally—be considered to be a closed switch.

If a short circuit now occurs in the drive unit M, the corresponding current increases immediately in each of the sections. For this reason, the voltage of the current measuring element 28 increases equally, wherein it exceeds the reference voltage Uref or the threshold from a certain value of the current flowing through the respective section.

In this way, the output of the operational amplifier 291 changes to mass potential and thereby controls the driver 292, which thereby changes into a state in which the semiconductor switch element 27 or the transistor interrupts the current flowing in the corresponding section. In other words, the transistor is placed in its non-conductive state. The described interruption takes place individually in each of the sections 23-26, so that the sections are interrupted in an appropriate order depending on the flowing current.

The control of the semiconductor switch element 27 is carried out by the current measuring device 29 so quickly that in the event of a short-circuit the current flowing through the corresponding section remains very far below its maximum value, which is, for example, approx. 30 kA. It is achieved thereby according to the invention that cable sections and plugs can be dimensioned smaller with regard to the current strength.

As FIG. 1B shows, the vehicle store control device 3 is connected to each of the current measuring devices 29 at the output of the corresponding operational amplifier 291 and detects the switching of the operational amplifiers 291. In addition, the vehicle store control device 3 is also connected to the corresponding driver 292 of the current measuring device 29. If the vehicle store control device 3 is designed in such a way that it detects the switching of the operational amplifier 291 correspondingly quickly, then alternatively control of the driver 291 could also be carried out by the vehicle store control device 3.

The control of the semiconductor switch element 27 also causes the vehicle store control device 3 to electrically separate the vehicle energy store from the drive unit by controlling the contactor 211 accordingly.

When the cause of the short circuit is fixed and the vehicle store control device 3 receives this information, it controls the drivers 292 accordingly, thereby returning the drivers to the state in which they set the semiconductor switch element 27 into its conductive state. In addition, the vehicle store control device 3 closes the contactor 211 again.

Short-Circuit when Charging the Vehicle Energy Store 2

If the vehicle energy store 2 according to the invention has to be charged after the operation of the drive unit M, an external energy supply is connected to the connection of positive potential 21 and to the connection of negative potential 22 for this purpose.

If a short circuit occurs in this state, in that the energy storage cells of one of sections number 23-26 burn out, the corresponding short-circuit current occurs, at least in the section causing the short-circuit. This short-circuit current has an inverted sign compared to the case in which the short circuit occurs during discharging as explained above, i.e. in which the short-circuit current flows in the opposite direction.

The respective current measuring device 29 assigned to the corresponding section may also detect the short-circuit current that occurs when charging the vehicle energy store 2, but the switching of the semiconductor switch element 27 or the transistor does not lead to an interruption of the current flow. This is due to the fact that field effect transistors have an intrinsic diode that makes it impossible to interrupt the current flowing in the necessary direction. In order to detect the short-circuit case occurring during charging despite this and to interrupt the entire current flowing through the vehicle energy store 2, the vehicle store control device 3 is connected to the current measuring devices 29 and thereby detects the switching of the affected operational amplifiers 291.

If the vehicle store control device detects the short-circuit case via the current measuring devices 29, it controls the contactor 211 to electrically isolate the vehicle energy store 2 from the drive unit M. In case the contactor 211 cannot be opened, the switching arrangement 210 also comprises a safety fuse 212 for this purpose.

Figure 2:
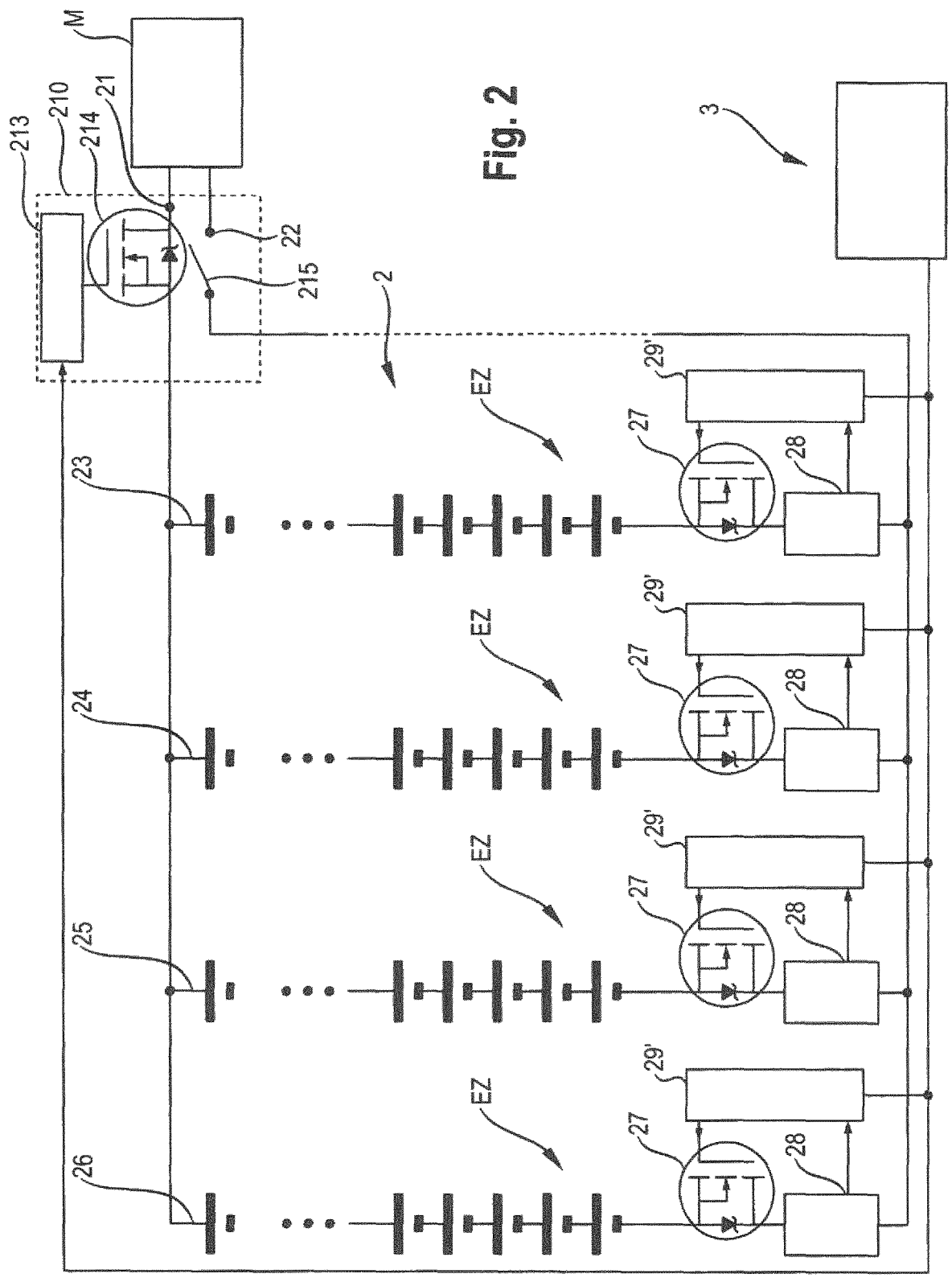
FIG. 2 shows a vehicle energy storage system according to the invention in accordance with a second preferred embodiment, which is different from the first embodiment in the design of the switching arrangement.

FIG. 2 shows a vehicle energy storage system 1' according to a second preferred embodiment of the invention.

The vehicle energy storage system 1' shown differs from that of the first preferred embodiment in the design of the switching arrangement 210 and the current measuring devices 29'. The remaining elements are identical to those of the first preferred embodiment and therefore bear the same reference characters. In this respect, reference is made to the descriptions for the first preferred embodiment.

The switching arrangement 210 of the second preferred embodiment of the vehicle energy storage system 1' according to the invention comprises no contactor and no fuse, but includes a semiconductor controller 213, which is connected to each of the power measuring devices 29' and the vehicle store control device 3, a further semiconductor switch element 214 controllable by the semiconductor controller 213 and an ordinary mechanical switch 215 for electrical separation of the electric drive unit M from the vehicle energy store 2. The customary mechanical switch is expendable and can be omitted, so that the vehicle energy store 2 according to the invention no longer comprises any mechanical switches.

The vehicle energy store 2 of the second preferred embodiment of the invention is identical to that of the first preferred embodiment, i.e. it contains the number of sections 23 through 26, in each of which at least one semiconductor switch element 27 is disposed for interrupting the corresponding current flow.

The operation of the vehicle energy store 2 in the event of a short-circuit during normal discharging is identical to the operation of the vehicle energy store 2 from FIG. 1A, therefore reference is made to the versions there.

However, the operation of the vehicle energy storage system 1' differs in the case of a short circuit/overcurrent during normal charging of the vehicle energy store 2.

Short-Circuit/Overcurrent During Charging of the Vehicle Energy Store 2

During a process of charging the vehicle energy store 2, an external energy supply is connected to the connection of positive potential 21 and to the connection of negative potential 22. The switch 215 is closed.

If a short circuit or overcurrent occurs in this state, which is triggered, for example, by the energy storage cells EZ of one of the sections 23-26 burning out or the external energy supply introducing an excessive current, the current flowing in the corresponding section rises immediately (short-circuit current or overcurrent).

As in the first preferred embodiment, the field effect transistors 27 are not able to interrupt the short-circuit current/overcurrent, although the current measuring device 29 connected to the corresponding field effect transistor via the current measuring element 28 detects the short-circuit current and controls the corresponding field effect transistor. This is again due to the intrinsic diode of the field effect transistors.

In order to nevertheless control the short circuit occurring during charging of the vehicle energy store 2, compared to the configuration of the first preferred embodiment each of the current measuring devices 29' includes a further operational amplifier with the inputs thereof connected in such a way that the corresponding output changes over when the short-circuit current/overcurrent occurs. The outputs of the further operational amplifiers are connected to the semiconductor controller 213, wherein this, like the current measuring devices 29 of the first preferred embodiment, contains a driver that is placed in such a state when one of the outputs of the further operational amplifiers changes over that the further semiconductor switch element 214 is switched to the non-conductive state. Alternatively, the control of the driver of the switching arrangement could also be carried out by the vehicle store control device 3, if this can detect the changeover of the outputs of the further operational amplifiers sufficiently quickly.

Similar to the semiconductor switch elements 27, a number of parallel connected further semiconductor switch elements 214 may also be provided in the switching arrangement 210.

The control of the further semiconductor switch element 214 that is performed can be carried out so quickly that the short-circuit current remains far below its maximum value or the overcurrent remains below a maximum permissible value. The speed of the control is in the same order of magnitude as the control of the semiconductor switch elements 27.

In the second preferred embodiment, it is possible to interrupt the total current flowing through the vehicle energy store 2 by semiconductor switch elements 27 or 214, if either a short-circuit occurs during proper discharging or a short circuit/overcurrent occurs during proper charging; generally speaking, both cases are covered by controlling semiconductor switch elements.

The second preferred embodiment therefore makes it possible to also make the switch 215 installed in the switching arrangement 210 weaker in terms of current strength. As already mentioned, this switch 215 can also be entirely omitted.

In general, the explanations and descriptions given in the general part before the description of the figures also apply to the described embodiments.

In both embodiments, the current flowing through the vehicle energy store 2 is interrupted by the switching arrangement 210 if the short circuit occurs during a proper charging process.

Alternatively, another semiconductor switch element, i.e. another field effect transistor, can be disposed in each of the sections 23-26, which is however disposed such that the intrinsic diode is reversed compared to that shown and the corresponding field effect transistor can interrupt the short-circuit current/overcurrent during a proper charging process. As with the semiconductor switch elements 27 shown in FIGS. 1A and 2, a number of other semiconductor switch elements that are connected to each other in parallel can also be used. The semiconductor switch element(s) is/are then also connected via the gate connection thereof to the respective current measuring device 29, which jointly controls all semiconductor switch elements, i.e. field effect transistors, in the event of a short circuit/overcurrent.

The transistors of the preferred embodiments are not limited to field effect transistors. Other transistors, such as IGBTs, or completely different semiconductor switch elements, such as thyristors, may also be used.

In the preferred embodiments, field effect transistors of the enhancement type (n-channel) are shown. Again, the invention is not limited thereto. For example, p-channel transistors can be used. In addition, depletion type transistors can also be used.

The determination of the threshold values or of the reference voltages Uref that are used in the individual sections can be carried out depending on how many individual energy storage cells EZ are disposed in the corresponding section.

In the two preferred embodiments, each section is assigned its own current measuring device 29. Alternatively, it is conceivable to use only a single current measuring device 29 that is connected to each of the current measuring elements 28. If in this case the current flowing in one of the sections 23-26 exceeds the threshold specified in the current measuring device 29, the current measuring device controls the total of all semiconductor switch elements 27 simultaneously.

Figure 3:
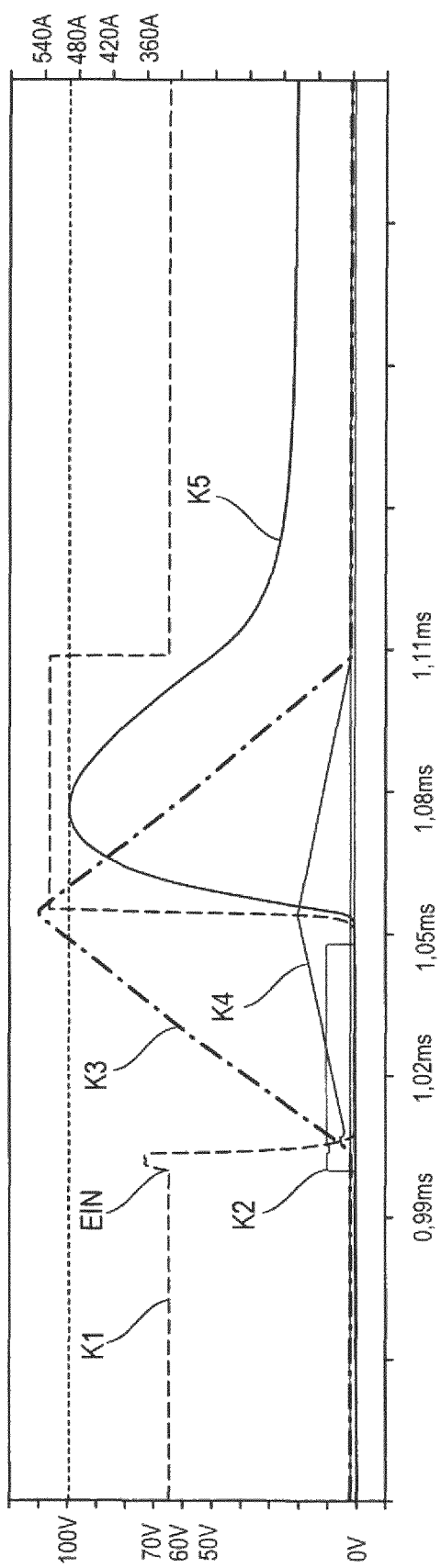
FIG. 3 shows the signal curves of a simulation, which shows qualitatively that the short-circuit currents remain manageable due to the use according to the invention of at least one semiconductor switch element in each section of the vehicle energy store.

FIG. 3 shows the signal curves of a simulation performed by the inventor.

The simulation was carried out on the basis of a vehicle energy store with a single section for the case in which the vehicle energy store is in a normal discharge process and the short circuit occurs with the corresponding current direction. This single section contained fourteen individual energy storage cells, which were connected in series.

This resulted in a total voltage of 60V and a nominal current of 200 A.

Six parallel switched field effect transistors were disposed in the section that were controlled by a corresponding current measuring device, which, as in the embodiments, measured the current flowing in the single section by means of a measuring resistor.

The dotted line K1 shows the voltage UDS that drops across the drain source channels of the field effect transistors. At the time that corresponds to point EIN, the field effect transistors are placed in their conductive state by switching a gate control signal (line K2) accordingly.

Immediately after switching on the field effect transistors, the mentioned short circuit occurs, wherein the corresponding short-circuit current increases rapidly (dash-dotted line K3), which is practically limited only by the line inductances or line resistances. The corresponding values in the simulation were about 5 µH and 14Ω. The individual current flowing through each of the field effect transistors increases accordingly (line K4).

The threshold value or the reference voltage Uref for triggering the interruption of the current flow was set at 480 A.

The control time of the field effect transistors by the current measuring device was about 70 µs in the worst case; in FIG. 3 it can be seen that the gate control signal is switched after this period of time (see sloping edge of line K2).

In this case, the value of the maximum short-circuit current was about 540 A, i.e. about 90 A per field effect transistor, wherein the voltage UDS that drops across the drain source channels of the field effect transistors increased to approximately 110V. After the short-circuit current (line K3) decreases, the field effect transistors remain in their switched-off state, in which the voltage UDS has the same value as before point EIN.

This maximum short-circuit current at an assumed ambient temperature of 50° C. led to heating of the field effect transistors (Mosfet) to approx. 150° C. (line K5 in FIG. 3), wherein the field effect transistors used can easily withstand 175° C.

It can be shown purely qualitatively by this simulation that by the use of semiconductor switch elements the interruption of short-circuit currents can take place so quickly that the occurring maximum currents are greatly reduced and remain controllable.

The gradients shown in FIG. 3 relate to the following measures

K1: Voltage $U_{DS}$ that drops across the drain source channels of the field effect transistors;

K2: Gate control signal; Voltage $U_{GS}$ that drops between the gate source ports of the field effect transistors K3: Short-circuit current K4: Individual short-circuit current per transistor K5: Temperature of the transistors The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle energy store for the electrical supply of an electric drive unit of a motor vehicle, the energy store comprises:
   a connection of positive potential and a connection of negative potential connected to the drive unit when the vehicle energy store is operated normally;
   a first section connecting the connection of positive potential and the connection of negative potential to each other and in which at least one electrical energy storage cell is disposed;
   a second section parallel to the first section that connects the connection of positive potential and the connection of negative potential to each other and in which at least one electrical energy storage cell is disposed,
   wherein at least one semiconductor switch element configured to be controlled to interrupt a current flowing in a respective one of the first section and the second section is disposed in each of the first section and the second section;
   a first current measuring element disposed in the first section; and
   a second current measuring element disposed in the second section,
   wherein the first and second current measuring elements are connected to one or more current measuring devices configured to measure the current flowing in the first section and the second section, respectively.

2. The vehicle energy store according to claim 1, further comprising:
   a first current measuring device assigned to the first section connected to the first current measuring element disposed in the first section and configured to measure the current flowing in the first section; and a second current measuring device assigned to the second section connected to the second current measuring element disposed in the second section and configured to measure the current flowing in the second section, wherein the first current measuring device assigned to the first section is configured to measure the current flowing in the first section and to control the semiconductor switch element disposed in the first section to interrupt the current flowing when the current flowing in the first section exceeds a first threshold, and wherein the second current measuring device assigned to the second section is arranged to measure the current flowing in the second section and to control the semiconductor switch element disposed in the second section to interrupt the current flowing when the current flowing in the second section exceeds a second threshold.

3. The vehicle energy store according to claim 1, further comprising:

a current measuring device assigned to both the first section and the second section and which is connected to the first and second current measuring elements and configured to measure current flowing in the first and second sections, respectively, wherein the current measuring device is configured to control the semiconductor switch element disposed in the first section and the semiconductor switch element disposed in the second section to interrupt current flowing in a respective one of the first and second section if current flowing in the respective one of the first and second section exceeds a threshold value.

4. The vehicle energy store according to claim 1, wherein the one or more current measuring devices each contains a comparator circuit configured to compare current measured by a respective one of the first current measuring element and the second current measuring element with a threshold, and to control the semiconductor switch element disposed in the first section and the semiconductor switch element disposed in the second section to interrupt current flowing in a respective one of the first and second section if current flowing in the respective one of the first and second section exceeds the threshold.

5. The vehicle energy store according to claim 2, wherein each of the first current measuring device and the second current measuring device contains a comparator circuit configured to compare current measured by a respective one of the first and second current measuring elements with the first or second threshold, respectively, and to control the semiconductor switch element disposed in the first section and the semiconductor switch element disposed in the second section to interrupt current flowing in a respective one of the first and second section if current flowing in the respective one of the first and second section exceeds the first or second threshold, respectively.

6. The vehicle energy store according to claim 3, wherein the current measuring device assigned to both the first section and the second section contains a comparator circuit configured to compare current measured by a respective one of the first and second current measuring elements with the threshold value, and to control the semiconductor switch element disposed in the first section and the semiconductor switch element disposed in the second section to interrupt current flowing in a respective one of the first and second section if current flowing in the respective one of the first and second section exceeds the threshold value.

7. The vehicle energy store according to claim 2, wherein a plurality of semiconductor switch elements are disposed in the first section and/or the second section, wherein the plurality of semiconductor switch elements includes a group of parallel connected semiconductor switch elements which are jointly controlled by the first current measuring device and/or the second current measuring device, respectively, to interrupt current flowing in a respective one of the first and second section if current flowing in the respective one of the first and second section exceeds the first threshold or the second threshold, respectively.

8. The vehicle energy store according to claim 3, wherein a plurality of semiconductor switch elements are disposed in the first section and/or the second section, wherein the plurality of semiconductor switch elements includes a group of parallel connected semiconductor switch elements which are jointly controlled by the current measuring device to interrupt current flowing in a respective one of the first and second section if current flowing in the respective one of the first and second section exceeds the threshold value.

9. The vehicle energy store according to claim 4, wherein a plurality of semiconductor switch elements are disposed in the first section and/or the second section, wherein the plurality of semiconductor switch elements includes a group of parallel connected semiconductor switch elements which are jointly controlled by the one or more current measuring devices to interrupt current flowing in a respective one of the first and second section if current flowing in the respective one of the first and second section exceeds the threshold value.

10. The vehicle energy store according to claim 7, wherein at least a part of the group of parallel connected semiconductor switch elements is disposed in the first section and together interrupt current flowing in the first section by the first current measuring device if current flowing in the first section in a certain direction exceeds the first threshold;

at least a part of the group of parallel connected semiconductor switch elements is disposed in the second section and is jointly controlled by the second current measuring device to interrupt current flowing in the second section if current flowing in the second section in the certain direction exceeds the second threshold;

wherein the plurality of semiconductor switch elements includes a further group of parallel connected semiconductor switch elements, wherein the further group of parallel connected semiconductor switch elements disposed in the first section is jointly controlled by the first current measuring device to interrupt current flowing in the first section if current flowing in the first section exceeds the first threshold in a direction opposite to the certain direction, and wherein the further group of parallel connected semiconductor switch elements disposed in the second section is jointly controlled by the second current measuring device to interrupt current flowing in the second section if current flowing in the second section exceeds the second threshold in a direction opposite to the certain direction.

11. The vehicle energy store according to claim 8, wherein
at least a part of the group of parallel connected semiconductor switch elements is disposed in the first section and together interrupt current flowing in the first section by current measuring device if current flowing in the first section in a certain direction exceeds the threshold value;
at least a part of the group of parallel connected semiconductor switch elements is disposed in the second section and is jointly controlled by the current measuring device to interrupt current flowing in the second section if current flowing in the second section in the certain direction exceeds the threshold value;
wherein the plurality of semiconductor switch elements includes a further group of parallel connected semiconductor switch elements,
wherein the further group of parallel connected semiconductor switch elements disposed in the first section is jointly controlled by the current measuring device to interrupt current flowing in the first section if current flowing in the first section exceeds the threshold value in a direction opposite to the certain direction, and
wherein the further group of parallel connected semiconductor switch elements disposed in the second section is jointly controlled by the current measuring device to interrupt current flowing in the second section if current flowing in the second section exceeds the threshold value in a direction opposite to the certain direction.

12. The vehicle energy store according to claim 9, wherein
at least a part of the group of parallel connected semiconductor switch elements is disposed in the first section and together interrupt current flowing in the first section by the one or more current measuring devices if current flowing in the first section in a certain direction exceeds the threshold value;
at least a part of the group of parallel connected semiconductor switch elements is disposed in the second section and is jointly controlled by the one or more current measuring devices to interrupt current flowing in the second section if current flowing in the second section in the certain direction exceeds the threshold value;
wherein the plurality of semiconductor switch elements includes a further group of parallel connected semiconductor switch elements,
wherein the further group of parallel connected semiconductor switch elements disposed in the first section is jointly controlled by the one or more current measuring devices to interrupt current flowing in the first section if current flowing in the first section exceeds the threshold value in a direction opposite to the certain direction, and
wherein the further group of parallel connected semiconductor switch elements disposed in the second section is jointly controlled by the one or more current measuring devices to interrupt current flowing in the second section if current flowing in the second section exceeds the threshold value in a direction opposite to the certain direction.

13. The vehicle energy store according to claim 1, which further comprises:
a switching arrangement disposed in series with the first and second sections, which comprises a further semiconductor switch element, wherein the switching arrangement is configured to control, based on a control signal, the further semiconductor switch element to interrupt all current flow through the vehicle energy store.

14. A vehicle energy storage system for the electrical supply of an electric drive unit of a motor vehicle, comprising:
a vehicle energy store according to claim 13; and
a vehicle store control device that is connected to the further semiconductor switch element to interrupt all current flowing through the vehicle energy store and to one or more current measuring devices in order to obtain information about whether current flowing in the first and/or second section exceeds a corresponding threshold,
wherein the vehicle store control device is configured to control the further semiconductor switch element to interrupt all current flowing through the vehicle energy store if current flowing in the first and/or second section exceeds the corresponding threshold.

15. A motor vehicle comprising a vehicle energy store for the electrical supply of an electric drive unit of a motor vehicle, the energy store comprises:
a connection of positive potential and a connection of negative potential connected to the drive unit when the vehicle energy store is operated normally;
a first section connecting the connection of positive potential and the connection of negative potential to each other and in which at least one electrical energy storage cell is disposed;
a second section parallel to the first section that connects the connection of positive potential and the connection of negative potential to each other and in which at least one electrical energy storage cell is disposed,
wherein at least one semiconductor switch element configured to be controlled to interrupt a current flowing in a respective one of the first section and the second section is disposed in each of the first section and the second section;
a first current measuring element disposed in the first section; and
a second current measuring element disposed in the second section,
wherein the first and second current measuring elements are connected to one or more current measuring devices configured to measure the current flowing in the first section and the second section, respectively.

* * * * *